United States Patent

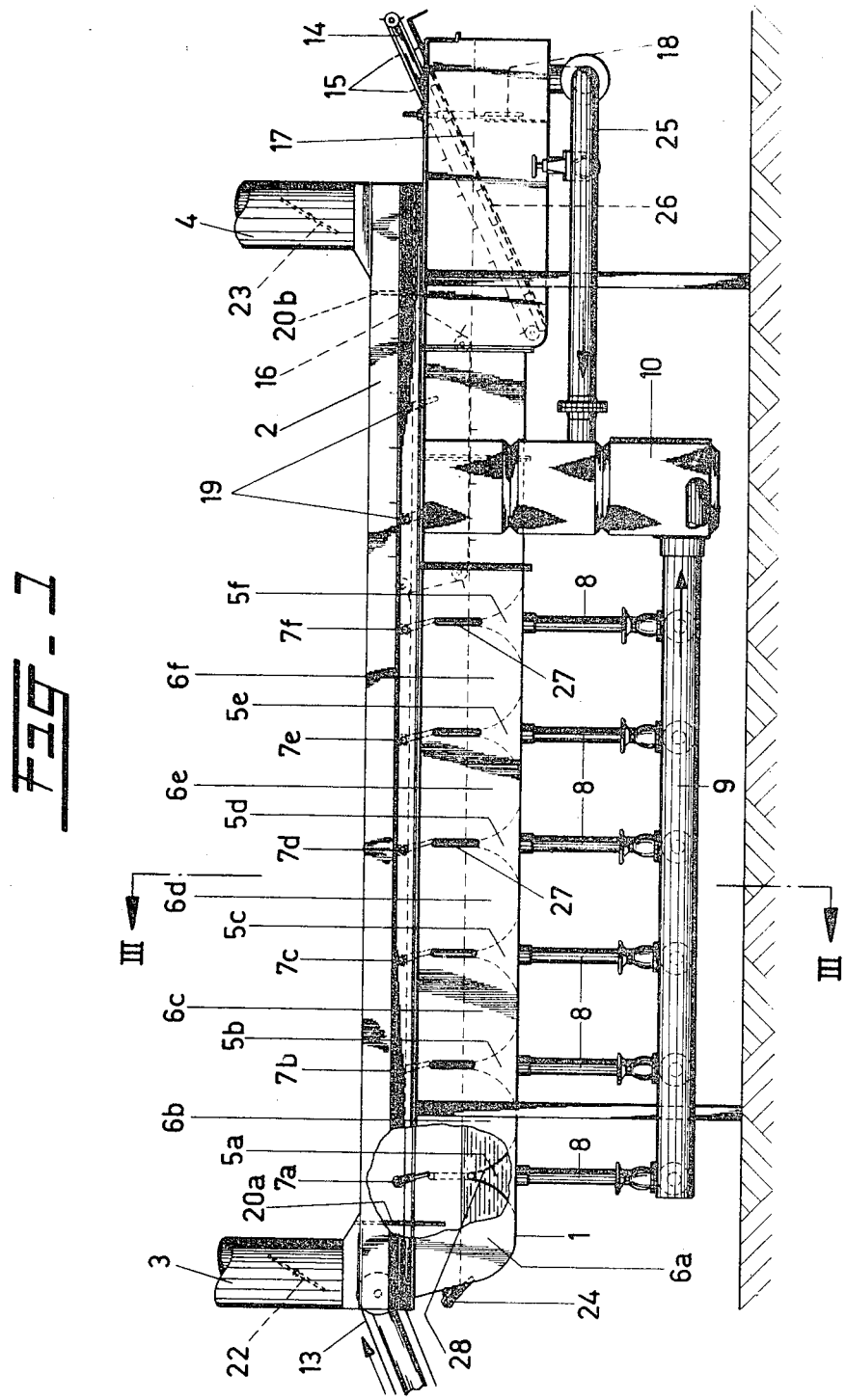

Sijbring

[15] 3,641,924
[45] Feb. 15, 1972

[54] OVEN FOR FRYING EDIBLE PRODUCTS, SUCH AS POTATO CHIPS

[72] Inventor: Pieter Herman Sijbring, Rhenen, Netherlands

[73] Assignee: Instituut Voor Bewaring En Verwerking Van Landbouwprodukten

[22] Filed: Oct. 29, 1969

[21] Appl. No.: 872,293

[30] Foreign Application Priority Data

Nov. 6, 1968  Great Britain......................52,570/68

[52] U.S. Cl..................................................99/406, 99/409
[51] Int. Cl........................................................A47j 37/12
[58] Field of Search.....................99/406, 404, 405, 407, 408, 99/409, 410, 239, 263, 1; 302/14, 15, 16

[56] References Cited

UNITED STATES PATENTS

| | | | |
|---|---|---|---|
| 1,707,786 | 4/1929 | Ehrhart | 99/406 |
| 2,027,558 | 1/1936 | Sherwood | 99/409 UX |
| 2,861,514 | 11/1958 | Sech | 99/406 |
| 3,209,678 | 10/1965 | Benson et al. | 99/406 |
| 3,223,024 | 12/1965 | Benson et al. | 99/404 X |

*Primary Examiner*—Walter A. Scheel
*Assistant Examiner*—Arthur O. Henderson
*Attorney*—Arnold Robinson

[57] ABSTRACT

An oblong tank cooker for edible products is provided with a plurality of partitions which form compartments below the level of the cooking liquid, such as oil, in the tank. The cooking liquid and product move trough the tank and within each compartment the cooking liquid and product are rotated around an axis substantially transverse to the longitudinal axis of the tank whereby cooking liquid and product move from one compartment into the next adjacent compartment toward the outlet end of the tank. In one preferred embodiment part of the cooking liquid is withdrawn from each compartment and heated and recycled back into the individual compartments.

9 Claims, 5 Drawing Figures

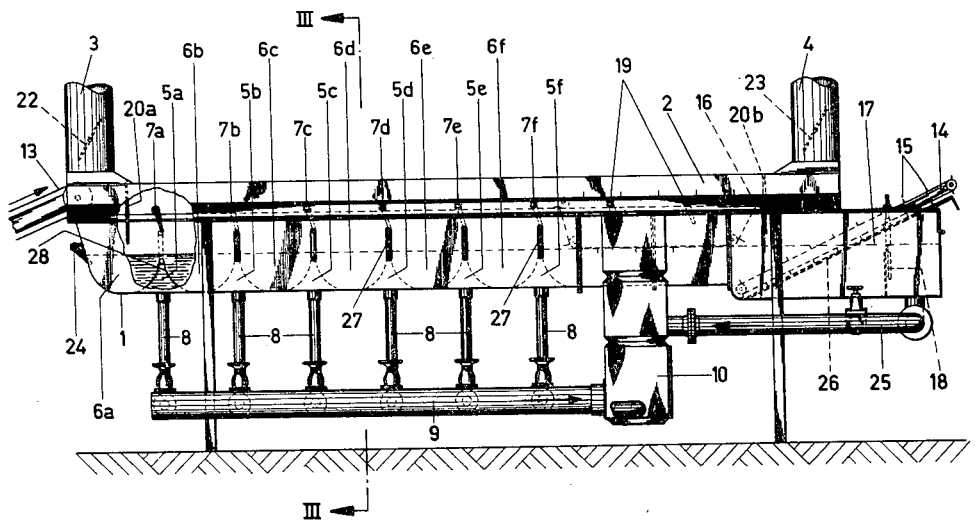

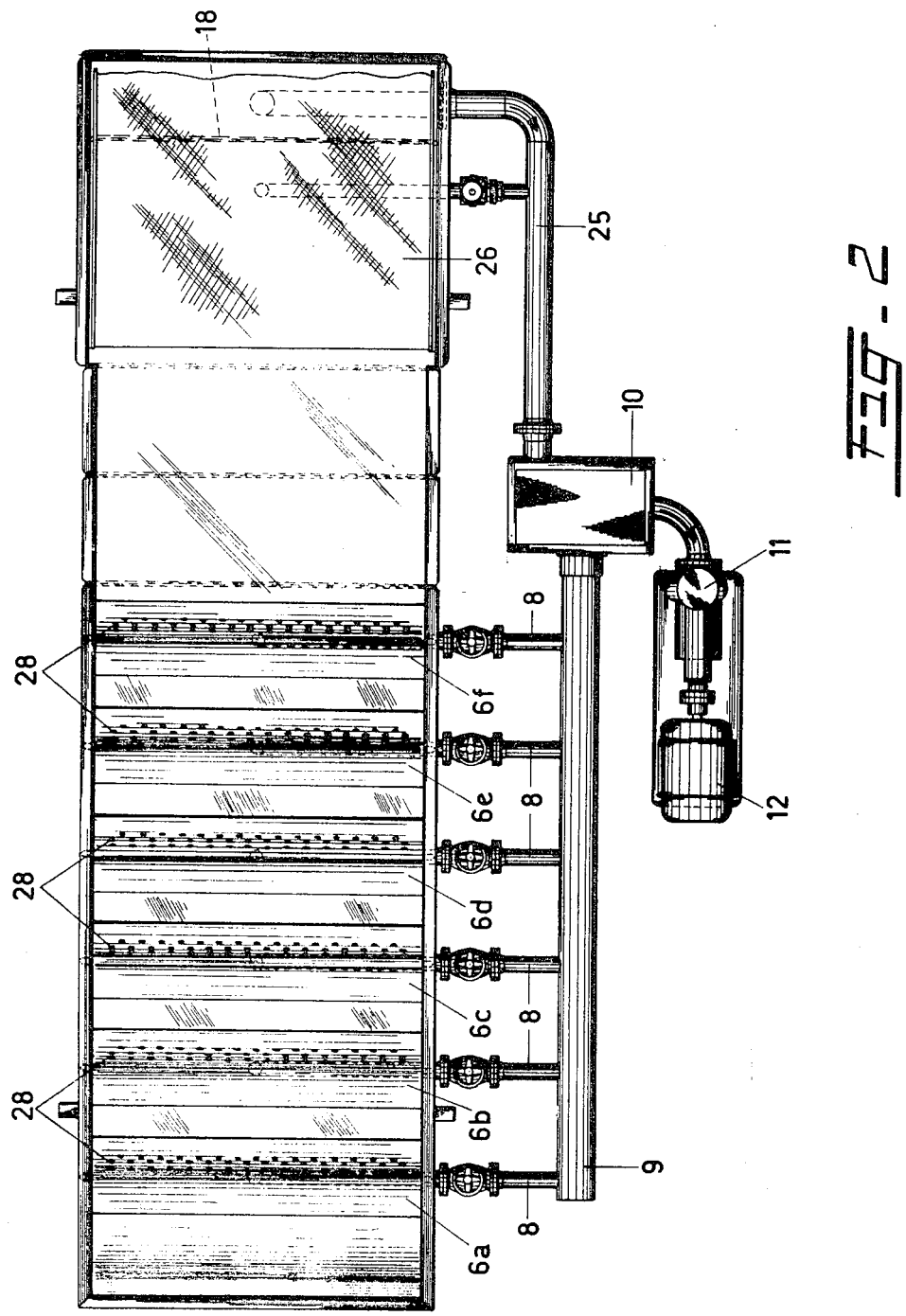

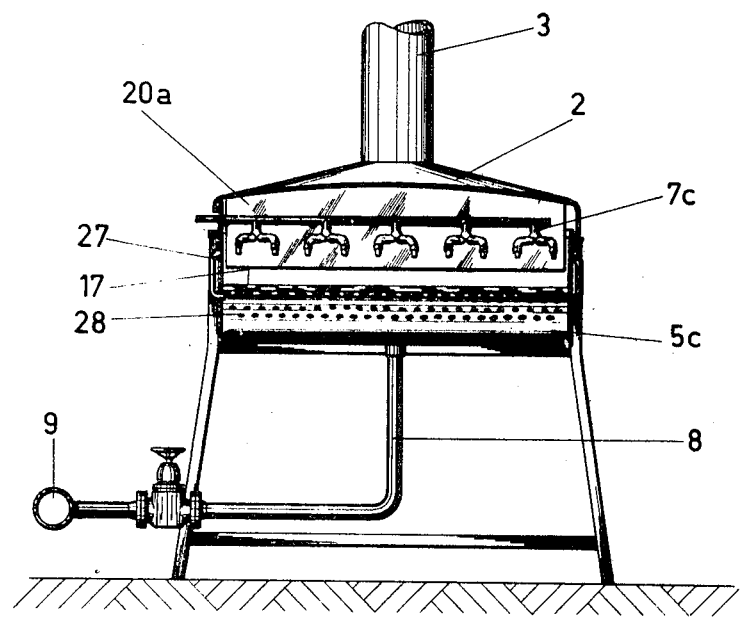

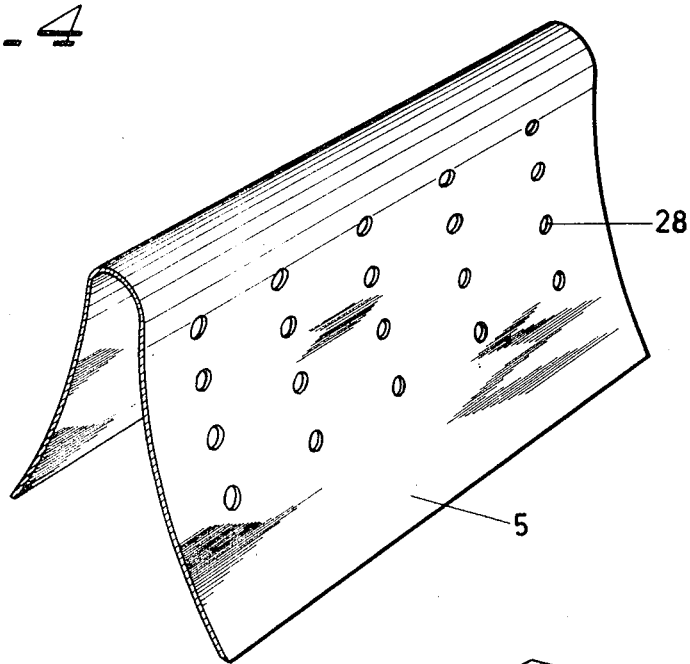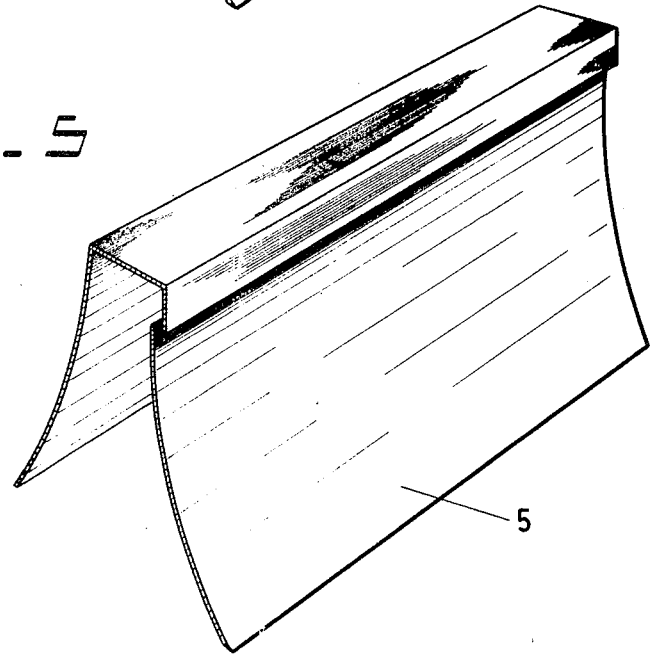

OVEN FOR FRYING EDIBLE PRODUCTS, SUCH AS POTATO CHIPS

The invention relates to an oven for frying edible products, such as potato chips. Such ovens generally comprise an oblong tank filled with oil which has been provided with a supply side and a discharge side, means for circulating the oil in the tank, and conveyor means near the discharge side of the tank for taking the fried product out of the oil. In addition to this there are heating elements which are usually situated in the oil-circulating system outside the tank but may also be heating the bottom of the tank directly. The conventional ovens of this type have also been provided with conveyor means between the supply side and the discharge side of the tank, said conveyor means serving to immerse the product in oil, to retard its progress, thus preventing the product from being carried off too fast towards the discharge side. Those conveyor means consist of a perforated conveyor provided with carriers, the lower part of which is in the oil, or it may consist of upright wheels provided with blades, the lower blades always dipping into the oil, or of paddles moving according to the sides of a rectangle, dipping into the oil on their lowest, horizontal direction of travel, etc.

Notwithstanding said retarding and regulating action of the conveyor means, it has been found that the fried product is showing quite a few variations in color, by which variations differences in moisture content are indicated. It has been discovered that these variations may be based on the following grounds:

1. Edible products of relatively great thickness will retain the moisture longer than products being less thick; in general chips having less thickness, for instance, are darker in color than thick chips fried at the same time.
2. Some of the products (potato chips, for instance) are inclined to stick together right at the supply side of the oven tank, causing a lumpy mass to occur, the innermost slices of which hardly giving off any moisture at all during the frying process.
3. The undermost sticks or slices in the mass of product to be fried moving towards the discharge side of the tank, said mass not reaching down to the bottom, will generally be carried off faster by the oil stream than the remainder of the mass.
4. At the supply side of the oven vapor bubbles will be liberated, which will attach themselves to the product and effect the behavior of the product in the oil, (compare foam separation); the amount of bubbles attaching themselves to the product will depend on the shape of the product, so that the formation of bubbles may also cause variations to occur in the frying process. Furthermore, the vapor bubbles attached to the product will be the cause of a poor heat transference.

It is the object of the invention to prevent the occurrence of variations in moisture content and color in frying edible products, and to furnish an oven with which more specifically the aforementioned adverse effects of the lowermost sticks sticking together and escaping from the tank, and vapor bubbles attaching themselves to the product are avoided.

This object is achieved according to the invention by the fact that at least part of the tank is formed to one or more rotation flow vessels with the aid of partitions or similar separating means, each of these rotation flow vessels being provided with means for rotating the mixture of oil and product around an axis substantially transverse to the longitudinal direction of the tank.

This rotation flow prevents the slices from sticking together and the vapor bubbles from attaching themselves to the product, while the partitions see to it that all the slices have practically the same residence time in the oven.

When dealing with a product having a relatively low moisture content, in principle a single rotation flow vessel will suffice; the remaining part of the tank may then be a whole and have been provided with a conveyor immersing the product in the oil. Potato chips, however, have such a high moisture content that in order to attain the effect described above (fewer variations in the frying process) several rotation flow vessels are required.

A simple solution for the construction of the partitions in the rotation flow vessels consists in the partitions being formed by reversed V-shaped hollow bodies with concave sidewalls, said bodies having been disposed spaced from each other with their open bottom parts on the bottom of the tank.

There are several possible systems for rotating the oil, such as a blade wheel, or a central supply pipe provided with tangential slots.

It has been found, however, that the best results are obtained when the means for rotating the oil comprise supply nozzles tangentially disposed with respect to the rotation flow vessels, the rotation flow vessels being in communication with outlets, a substantially equal quantity of oil being discharged through each outlet as is supplied by the tangential nozzles above.

An advantage of applying tangential nozzles is that there is no need for rotating parts.

It is necessary for the oil to be discharged from each rotation flow vessel in order to maintain a substantially constant speed per unit of volume across all cross sections, as viewed in longitudinal direction thereof.

A favorable possibility of discharging oil from the rotation flow vessels is that the hollow partitions have been provided with one or more orifices and that an oil discharge debouches into the hollow of each partition.

If that part of the partitions which has been provided with orifices is in the shape of a sieve bend, there is the advantage that the orifices may be quite large and the oil stream meets with little resistance, without any slices of product, being smaller than the cross section of the orifices being carried off by the discharge streams.

To prevent the formation of an air bubble in the upper part of the hollow partition, there may be one or more small vent pipes between the upper part of each partition and the space above the oil level.

If there is only steam to be discharged above the oil level and the oil and the product are prevented from oxidizing by the absence of air, a better final product may be obtained. This may be achieved by covering the tank and connecting the space above the oil level with steam outlets provided with regulating valves, a partition plate being provided near the supply side and near the discharge side said partition plates extending from the covering to shortly above the oil level, said regulating valves and partition plates being adjusted in such a way that there may be a slight excess pressure over the oil level and the air is prevented from flowing inwards.

The oil supply nozzles downstream from the aforementioned partition plate are preferably located above the oil level. The product is immersed in the oil by the streams colliding with the oil level, this being favorable for getting the mixture of oil and product to rotate. At the rotation flow vessel upstream from the aforementioned partition plate, the nozzle is preferably situated below the oil level to prevent the oil and the product from oxidizing.

Finally, the invention solves the problem of the circulating oil having to be filtered in order to separate the small pieces of product. Up to now, a number of filters had to be provided between the outlet and the inlet of the oil pipe, said filters having to be cleaned frequently. According to the invention the use of filters in the circulating system can be avoided, at least the cleansing need not be done as frequently, because a perforated sieve plate has been constructed underneath the transporter, said sieve plate being so close to the conveyor or chain that the carriers may scrape it, because of which the surface is kept clean and the small pieces of product are carried off together with the final product.

The oven according to the invention has not only the advantages described above but the additional advantage that the residence time of the product in the oven for a predetermined frying period is practically halved as compared with the conventional ovens, this means that for a predetermined capacity the floor area taken up by and the oil content required by the oven are considerably less. The principal reason is that the evaporation rate per $m^2$ is materially increased by a more efficient discharge of the vapor bubbles.

In using several rotation flow vessels there is the additional possibility of controlling the temperature of the oil along the entire length of the oven, and this by mixing the relatively cold oil flowing from the first series of rotation flow vessels (wherein a relatively large amount of moisture is lost by the product) with oil destined for the next series of rotation flow vessels.

The invention will now be elucidated further with reference to the figures showing a preferred embodiment of an oven according to the invention.

FIG. 1 shows a side elevational view of an oven according to the invention in which a section of the wall is thought to be broken away.

FIG. 2 shows an upper view of said oven, the cap supply nozzles, and conveyors being left out.

FIG. 3 shows a cross section along the line III—III in FIG. 2.

FIG. 4 shows a perspective view of part of a partition used in the oven according to the invention according to FIGS. 1, 2 and 3.

FIG. 5 shows a perspective view of a part of another embodiment of a partition.

The oven tank indicated with 1 is sealed by a detachable cap 2. The end portions of this cap communicate with steam outlets 3 and 4. On the bottom of said tank a number of hollow partitions 5a to f inclusive have been disposed. Said partitions have the shape of a reversed V with concave sides. One of these sides has been provided with orifices 28 for passing the oil. The partitions are not attached to the bottom of the container 1 in order to facilitate the cleaning thereof. Rotation flow vessels 6a to f inclusive have been formed. Above each of the top portions of the hollow partitions 5a to f inclusive are a series of oil nozzles 7a to f inclusive, the supply direction of which being directed in a substantially tangential direction with respect to the perforated concave side of the partitions 5.

A discharge pipe 8 for discharging the oil that has been flown into the hollow via the orifices 28 opens into each of the hollow partitions. All the pipes 8 communicate with a collecting tank 10 via a main discharge pipe 9, from which tank the oil may be sucked off by a pump 11 driven by the motor 12. This oil is forced towards the nozzles via pipes not shown in the drawing. In said pipes heat exchangers (not shown in the drawing) have been provided in the conventional way for heating the oil to be supplied. Per series of nozzles as much oil is supplied as is discharged by a pipe 8.

At the supply side of the oven (at the left in FIGS. 1 and 2) a supply conveyor 13 has been provided for the product to be fried. Said conveyor extends through the headwall of the cover 2, while being sealed as well as is possible.

At the discharge side of the oven a vertical conveyor 14 has been disposed, said conveyor serving to remove the fried product from the oil. For this purpose said conveyor is in an inclined position and has been provided with carriers 15. Said vertical conveyor 14 also being sealed with respect to the tank 1 in such a way that as little as possible of the air can get in the cap 2.

In the shown preferred embodiment six partitions 5a to f inclusive have been illustrated, said partitions separating six rotary tanks or compartments 6a to f inclusive. Between the last partition 5 and the vertical conveyor 14 there is a frying part in which the conveyor 16 provided with carriers has been mounted, said conveyor serving to immerse the product, having been carried by the oil across the last partition 5, into the oil. The level of the oil 17 is determined by the position of an adjustable partition plate 18. The upper edge of each of the partitions 5a to f inclusive is below the oil level 17. The difference of level between the oil level in the tank and that in the collecting tank 10 is an important factor in the amount of oil being discharged by the pipes 8. If too little oil is discharged the resulting increasing difference of level between the aforesaid levels will result in more oil being carried by the pipes. Therefore, there is within certain limits an automatic levelling off.

There is also a series of nozzles 7f above the last partition 5f, said nozzles serving to spout the product under the lower part of the conveyor 16.

Further nozzles 19 have been provided above the frying compartment where the conveyor 16 has been disposed; said nozzles serving to enable the oil temperature to be controlled.

Near the discharge 3 and 4 there is a partition plate 20a and 20b extending from the upper surface of the cap to just above the oil level 17. Furthermore, control valves 22 and 23 respectively have been provided in the outlets 3 and 4, said valves being adjusted in such a way that a slight excess pressure will be formed above the oil. As a result of this only steam will escape along the slit between the lower edge of the partition plates 20a and 20b during the operating process, whereas no air can flow in; said air would needlessly oxidize the oil and the product.

The risk is particularly great because near the supply side the nozzles are capable of sucking in air by injection.

At the supply side of the tank 1 there is a series of oil supply nozzles 24 which have not been disposed above, but below the oil level in a tangential position with respect to the first rotation flow vessel; the reason for this being that this position is upstream from the partition plate 20, and that a series of nozzles disposed above the oil level would be capable of sucking in air.

At the far end of the container 1, below the vertical conveyor 14, oil is discharged via the pipe 25, and this at a quantity substantially corresponding with the quantity supplied in the nozzles 24, 19. The pipe 25 opens into the collecting tank 10 below the oil level.

When the oven is operating, the tangential flows of oil coming from the nozzles 24 and 7 cause a rotary motion to occur around a central transverse axis of the oily product in each of the rotation flow vessels 6. Inasmuch as the nozzles 7a to e inclusive are disposed above the oil level 17 in the vessels 6b to f inclusive, the product is spouted into the oil, which is conducive to the effect aimed at.

Said rotation prevents the product from sticking together, and promotes a timely escape of the vapor bubbles, while preventing them from attaching themselves to the product to a far less extent. The primary object of the partitions 5 is to limit the rotation flow vessels, while they are also adapted to take care that there are no great differences in residence time of all the slices or sticks due to being carried off by a fast flowing stream of oil.

The product is therefore fried to a uniform color. To improve the discharge of the vapor bubbles, the evaporation rate per m.$^2$ of oil is considerably increased, which results in an accelerated frying process. It has been found in practice that the residence time of the product in the oil, and thus for a predetermined frying capacity, the oil content may be reduced by half, as may be the floor area taken up by the oven, as compared with the conventional types of ovens.

The quantity of oil that has to be supplied in each rotation flow vessel 6b to f inclusive will depend on the amount of calories required for evaporating the moisture, and on the desired rotation of the mixture. The quantity of product to be supplied is adapted to the number of calories (that is fed to the oil as heat carrier) in such a way that there will not be too great a stream of vapor bubbles (would interfere with the rotation), and the product, too, flows in the oil to a sufficient degree.

The quantity of oil to be discharged per tank may also be controlled by valves, mounted in the pipes 8, or similar resistors, or by the choice in diameter of the pipes 8.

The number of rotation flow vessels in which the mixture is rotated, depends on the desired difference in moisture content before and after frying. In dealing with a product having a low moisture content, in principle, a single rotation flow vessel would suffice. When frying slices of potatoes (high moisture content) into chips five rotation flow vessels will produce an optimal result. The more vessels, the more uniform the final moisture content of the product.

The moisture content decreases to a greater extent in the first rotation flow vessels (6a and 6b for instance) than in the following vessels (6c to f). The temperature of the oil will also drop further in the first rotation flow vessels. The invention makes it possible, however, for the temperature of the oil in the longitudinal direction of the tank 1 to be adjusted, and this by mixing the cooled oil from the first rotation flow vessel with oil heated in the heat exchanger and destined for the next series of rotation flow vessels (6c to f inclusive), for example.

Underneath the vertical conveyor 14 is a sieve plate 26 provided with small perforation, said sieve being so close to the bottom part of the conveyor 14 that the carriers 15 are capable of scraping the plate 26 in order to remove the small pieces of product retained by said plate to have these pieces rejoin the product taken out of the oil. Therefore, the sieve 26 acts as a filter, the oil passing through and the small pieces of product being retained without the perforations getting blocked. In that case there is no need for a separate filter which has to be cleaned periodically to be mounted in the circulatory oil system, which is quite an advantage.

From the interior part of the hollow partitions 5 small vent pipes 27 extend above the oil level 17.

The concave shape of the sidewalls described above is particularly advantageous at the site of the orifices in the partitions 5, and this because of the sieve bend effect, oil being forced through the orifices because of the centrifugal action, while the product to be fried keeps rotating.

The aforementioned preferred embodiment of the invention is within the scope of the now following principal claim capable of many alterations and variations. In certain cases, for example, the conveyor 16 may be left out.

Furthermore, in FIG. 5 an alternative construction of a partition 5 has been illustrated, in which near the upper side a slot has been formed through which oil is discharged.

What is claimed is:

1. A cooker for edible products comprising an oblong vessel having an inlet at one end and an outlet at the other end, means for supplying a heated cooking liquid to said vessel adapted to circulate the liquid through said vessel toward the outlet thereof and to maintain the liquid at a selected level in the vessel, a plurality of partitions positioned below the level of said cooking liquid adapted to form a rotation flow compartment between each adjacent partition, a plurality of said compartments being formed along the length of the vessel, means for feeding an edible product into the inlet end of the vessel in the direction of the flow of liquid through said vessel said means for circulating the liquid being further adapted to rotate the cooking liquid and product within each rotation flow compartment around an axis substantially transverse to the longitudinal axis of said vessel and move said liquid and product from one compartment into the next adjacent compartment toward the outlet end of the vessel.

2. The cooker specified in claim 1 in which the partitions comprise reversed V-shaped hollow bodies having concave sidewalls, said bodies being located with their open bottom parts on the bottom of the vessel in spaced relationship.

3. The cooker specified in claim 1 in which the partitions have a concave sidewall and in which the means for circulating and rotating the liquid include liquid supply nozzles placed in a tangential position with respect to the concave sidewall of said partitions and a liquid outlet in each compartment for removing liquid in an amount substantially equal to that supplied to the compartment by said nozzles.

4. The cooker specified in claim 1 in which the partitions comprise reversed V-shaped hollow bodies each having one or more orifices therein, and in which the means for circulating and rotating the liquid include a liquid discharge pipe connected to the hollow of each partition.

5. The cooker specified in claim 1 in which the partitions comprise reverse V-shaped hollow bodies each having a curve in the sidewall provided with orifices to form a sieve bend.

6. The cooker specified in claim 1 in which the partitions comprise a hollow body member having one or more small vent pipes that extend between the upper part of the hollow of each partition and the space above the oil level in the vessel.

7. The cooker specified in claim 1 which includes a cap for the vessel, steam outlet means connected to the void above the level of the cooking liquid, a partition plate means located near the inlet side and near the outlet end of the vessel, said partition plate means extending from the cap down to just above the liquid level, said steam outlet means and partition plate means being adapted to provide a slight excess pressure above the liquid level to prevent air from entering the vessel.

8. The cooker specified in claim 1 in which the means for rotating the liquid and product in the said compartments include liquid supply nozzles positioned above the level of the liquid in the vessel.

9. The structure specified in claim 1 in which the means for removing the product from the vessel include a rotating endless conveyor provided with carriers for the product and a perforated sieve plate positioned underneath the endless conveyor in a location where the carriers of the conveyor will scrape the surface of the sieve plate.

* * * * *